(12) United States Patent
Xie et al.

(10) Patent No.: US 7,974,957 B2
(45) Date of Patent: Jul. 5, 2011

(54) ASSESSING MOBILE READINESS OF A PAGE USING A TRAINED SCORER

(75) Inventors: Xing Xie, Beijing (CN); Jihwan Song, Seoul (KR); Ji-Rong Wen, Beijing (CH)

(73) Assignee: Microsoft Corporation, Redmond, WA (US)

( * ) Notice: Subject to any disclaimer, the term of this patent is extended or adjusted under 35 U.S.C. 154(b) by 409 days.

(21) Appl. No.: 11/697,134

(22) Filed: Apr. 5, 2007

(65) Prior Publication Data
US 2008/0250009 A1    Oct. 9, 2008

(51) Int. Cl.
G06F 7/00 (2006.01)
G06F 17/00 (2006.01)
G06F 17/30 (2006.01)

(52) U.S. Cl. .................. 707/694; 707/705
(58) Field of Classification Search ............ 707/6
See application file for complete search history.

(56) References Cited

U.S. PATENT DOCUMENTS

| | | | |
|---|---|---|---|
| 5,950,200 A * | 9/1999 | Sudai et al. ............ 707/9 |
| 6,272,467 B1 * | 8/2001 | Durand et al. .......... 705/1 |
| 6,293,904 B1 * | 9/2001 | Blazey et al. .......... 600/26 |
| 6,735,568 B1 * | 5/2004 | Buckwalter et al. .... 705/1 |
| 7,035,620 B2 | 4/2006 | Ben-Efraim et al. |
| 2002/0133272 A1 * | 9/2002 | Ishioka et al. ......... 701/1 |
| 2002/0161928 A1 | 10/2002 | Ndili |
| 2002/0187774 A1 * | 12/2002 | Ritter et al. ........... 455/414 |
| 2004/0248566 A1 | 12/2004 | Suzuki |
| 2005/0086211 A1 * | 4/2005 | Mayer ..................... 707/3 |
| 2006/0059147 A1 * | 3/2006 | Weiss et al. ............ 707/6 |
| 2006/0123014 A1 * | 6/2006 | Ng ......................... 707/100 |
| 2006/0143066 A1 * | 6/2006 | Calabria ................. 705/10 |
| 2006/0161599 A1 * | 7/2006 | Rosen ..................... 707/201 |
| 2006/0200541 A1 | 9/2006 | Wikman et al. |
| 2006/0218234 A1 | 9/2006 | Deng et al. |
| 2006/0235941 A1 | 10/2006 | Arcas et al. |
| 2006/0242129 A1 * | 10/2006 | Libes et al. ............. 707/3 |
| 2007/0027839 A1 | 2/2007 | Ives |
| 2007/0050507 A1 * | 3/2007 | Ollikainen et al. ..... 709/227 |

(Continued)

FOREIGN PATENT DOCUMENTS

WO    WO-2006066613    6/2006

OTHER PUBLICATIONS

Xing Xie et al, Efficient Browsing of Web Search Results on Mobile Devices Based on Block Importance Model, May 8-12, 2005, IEEE, Proceedings of the 3rd IEEE Int'l Conf. on Pervasive COmputing and Communications (PerCom 2005), p. 2.*

(Continued)

*Primary Examiner* — Pierre M Vital
*Assistant Examiner* — Taelor Kim
(74) *Attorney, Agent, or Firm* — Perkins Coie LLP

(57) ABSTRACT

A method and system for ranking pages of a search result based on the mobile readiness of the pages is provided. A mobile-readiness system receives an indication of pages that are to be ranked. The mobile-readiness system evaluates the mobile readiness for each of the pages. Mobile readiness indicates suitability of the page for a mobile device. The mobile readiness system then ranks the pages based on the generated mobile readiness and some other criterion such as a relevance score or an importance score. The mobile-readiness system may train a classifier to classify pages based on their mobile readiness.

8 Claims, 5 Drawing Sheets

U.S. PATENT DOCUMENTS

| | | | |
|---|---|---|---|
| 2007/0061243 A1* | 3/2007 | Ramer et al. | 705/37 |
| 2007/0061301 A1* | 3/2007 | Ramer et al. | |
| 2008/0040389 A1* | 2/2008 | Seth et al. | 707/104.1 |
| 2008/0052312 A1* | 2/2008 | Tang et al. | 707/104.1 |
| 2008/0183699 A1* | 7/2008 | Hu et al. | 707/5 |
| 2009/0029687 A1* | 1/2009 | Ramer et al. | 455/414.3 |

OTHER PUBLICATIONS

Kerry Rodden et al., Effective Web Searching on Mobile Devices, 2003, University of Cambridge Computer Laboratory, pp. 1-20.*

Matt Jones et al., Sorting Out Searching on Small Screen Devices, 2002, Springer Berlin/Heidelberg, v.2411/2002, pp. 555-567.*

Simon Sweeney et al., Effective Search Results Summary Size and Device Screen Size, Jul. 2006, Information Processing and Managementv.42 issue 4, pp. 1056-1074.*

Mobile Web Best Practices 1.0, Jun. 2006, W3C Candidate Recommendation, pp. 1-50.*

Timothy Bickmore et al., Web Page Filtering and Re-Authoring for Mobile Users, Aug. 1999, Computer Journal, v.42 iss.6, pp. 534-546.*

Albers, et al. "User Web Browsing Characteristics Using Palm Handheld for Information Retrieval", *Proceedings of IEEE Professional Communication Society International Professional Communication Conference and Proceedings of the 18th Annual ACM International Conference on Computer Documentation: Technology and Teamwork*, Cambridge, MA, 2000, 125-135.

Chang, et al. "Efficient Web Search on Mobile Devices with Multi-Modal Input and Intelligent Text Summarization", 2002 (4 pages).

Chisholm, et al. "Web Content Accessibility Guidelines 1.0", *W3C Recommendation*, May 5, 1999, Available at <http://www.w3.org/TR/WAI-WEBCONTENT/>.

Hazael-Massieux, et al. "W3C MobileOKBasic Checker [Beta]", Revised Apr. 3, 2008, Available at <http://validatorw3.org/mobile/>.

Kamada, et al. "HTML 4.0 Guidelines for Mobile Access", *W3C Note*, Mar. 15, 1999, Available at <http://www.w3.org/TR/NOTE-html40-mobile/>.

Kameda. "Compact HTML for Small Information Appliances", *W3C Note*, Feb. 9, 1998, Available at <http://www.w3.org/TR/1998/NOTE-compactHTML-19980209/>.

Kamvar, et al. "A Large Scale Study of Wireless Search Behavior: Google Mobile Search", *CHI 2006*, Apr. 22-27, 2006, Copyright 2006 ACM (9 pages).

MobiReady Report (Beta), http://mr.dev.mobi, Copyright 2007.

Rabin, et al. "Mobile Web Best Practices 1.0 Basic Guidelines", *W3C Proposed Recommendation*, Nov. 2, 2006, Available at <http://www.w3.org/TR/mobile-bp/>.

* cited by examiner

ASSESSING MOBILE READINESS OF A PAGE USING A TRAINED SCORER

BACKGROUND

Many search engine services, such as GOOGLE and OVERTURE, provide for searching for information that is accessible via the Internet. These search engine services allow users to search for display pages, such as web pages, that may be of interest to users. After a user submits a search request (i.e., a query) that includes search terms, the search engine service identifies web pages that may be related to those search terms. To quickly identify related web pages, the search engine services may maintain a mapping of keywords to web pages. This mapping may be generated by "crawling" the web (i.e., the World Wide Web) to identify the keywords of each web page. To crawl the web, a search engine service may use a list of root web pages to identify all web pages that are accessible through those root web pages. The keywords of any particular web page can be identified using various well-known information retrieval techniques, such as identifying the words of a headline, the words supplied in the metadata of the web page, the words that are highlighted, and so on. The search engine service identifies web pages that may be related to the search request based on how well the keywords of a web page match the words of the query. The search engine service then displays to the user links to the identified web pages in an order that is based on a ranking that may be determined by their relevance to the query, popularity, importance, and/or some other measure. Three well-known techniques for determining importance or popularity of a page are PageRank, HITS ("Hyperlink-Induced Topic Search"), and DirectHIT.

Mobile devices, such as handheld personal computers, cell phones, and personal digital assistants ("PDAs"), are becoming increasingly popular ways to access the Internet. Unfortunately, the experience of users in accessing web pages using these mobile devices has been less than satisfactory. First, because these mobile devices have small display areas, it is difficult to effectively display in such a small display area a web page that is designed for a large display area. Second, because these mobile devices typically have a relatively slow communications link (e.g., via a cell phone network), it can take an unacceptably long time to download an accessed web page. Third, because the mobile devices have limited computing power, the rendering of a complex web page can also take an unacceptably long time.

Web page developers are currently attempting to create mobile-friendly pages taking into consideration the limitations of mobile devices. The W3C Mobile Web Initiative has published guidelines ("MWI Guidelines") to make web pages more mobile-friendly. Although these "mobile-friendly" pages are not "mobile-specific" pages, that is, written in Wireless Markup Language ("WML") or in Compact HTML ("cHTML"), they display and function well on mobile devices. Because the MWI Guidelines are not as strict as the limitations imposed by WML or cHTML, many web pages can satisfy the MWI Guidelines. As a result, the number of mobile-specific web pages is a small fraction of the number of mobile-friendly web pages. Since mobile search engines typically search only for mobile-specific pages, their search results can be less than satisfactory. General search engines typically do not treat mobile-friendly pages any differently than they treat other web pages. Since the number of mobile-friendly web pages is a small fraction of the total number of web pages, the web pages presented in search results of a general search engine are typically non-mobile-friendly and thus not suitable for display on a mobile device.

One technique has been described to assess mobile friendliness of web pages by applying various tests or rules to a web page. The technique then generates a weighted sum of the results of the tests to give an overall score of mobile friendliness. (MobiReady Report (Beta), "http://" followed by "mr." then "dev." and then "mobi".) The scores of the web pages generated by this technique, however, do not accurately represent what a person would think is a mobile-friendly web page.

Some techniques have been developed to dynamically adapt web pages that are too large for a small display area. One such adaptation technique is "page splitting," which attempts to divide a web page into blocks that can fit as a unit into a small display area. One such page-splitting technique analyzes the position and shape of HTML elements of a web page to identify blocks. However, it can be difficult to identify blocks from low-level HTML tags in a way that preserves page structure and does not lose information. An adaptive page is usually divided into many small pages, and the small pages are connected to each other through navigational links. As a result, it is difficult for mobile users to get a sense of the overall structure and organization of a web page by looking at one small page at a time.

SUMMARY

A method and system for ranking pages of a search result based on the mobile readiness of the pages is provided. A mobile-readiness system receives an indication of pages that are to be ranked. The mobile-readiness system evaluates the mobile readiness for each of the pages. Mobile readiness indicates suitability of the page for a mobile device. The mobile readiness of a page may be represented by a mobile-readiness score that may be generated using a mobile-readiness scorer that is trained using training data, by applying scoring rules that provide contributions to the mobile-readiness score, and so on. The mobile-readiness system then ranks the pages based on the generated mobile readiness and some other criterion such as a relevance score or an importance score.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
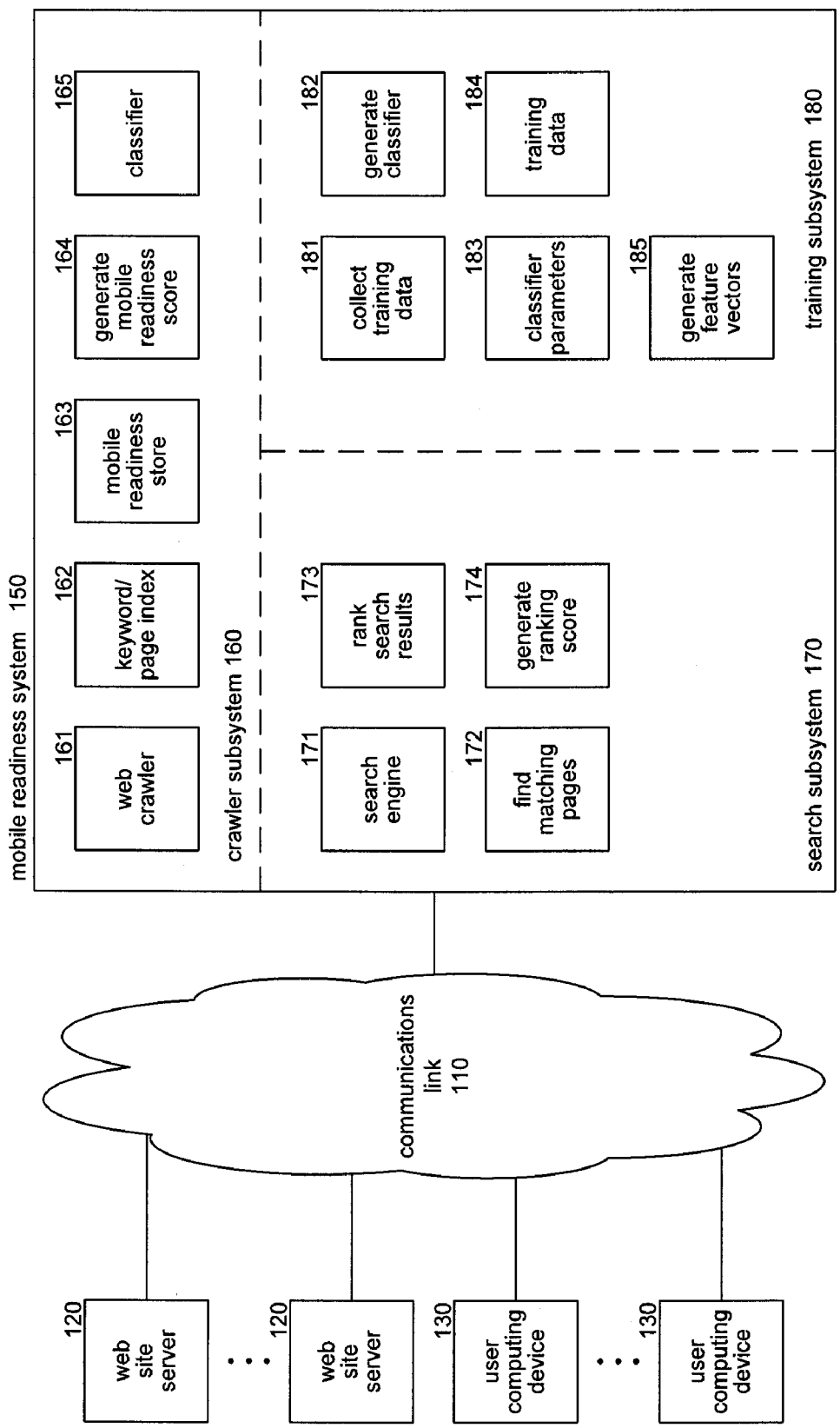
FIG. 1 is a block diagram that illustrates components of the mobile-readiness system in one embodiment.

A method and system for ranking pages of a search result based on the mobile readiness of the pages is provided. In one embodiment, a mobile-readiness system receives an indication of pages that are to be ranked. For example, the pages may be search results of a search request submitted to a search engine service. The mobile-readiness system generates a mobile-readiness score for each of the pages. A mobile-readiness score of a page is a quantitative measure of the suitability of the page for a mobile device. For example, a page that is developed in accordance with the Mobile Web Initiative Guidelines will likely have a higher score than a page that is developed without regard to the guidelines. The mobile-readiness score of a page may be generated using a mobile-readiness scorer that is trained using training data, may be generated by applying scoring rules that provide contributions to the mobile-readiness score, and so on. The mobile-readiness system then ranks the pages based on the generated mobile-readiness score and the score of some other criterion such as a relevance score or an importance score. For example, when the pages are search results, the mobile-readiness system may rank the pages based on a combination of relevance of the pages to the search request and mobile readiness of the pages. Thus, a page that has a high relevance but a low mobile readiness may be ranked lower than a page with lower relevance but higher mobile readiness. In this way, pages can be presented on a mobile device in an order that factors in the mobile readiness of the pages. When pages are presented to a mobile device in that order, mobile-ready pages will be ranked higher than non-mobile-ready pages with comparable content.

In some embodiments, the mobile-readiness system generates a mobile-readiness score using a mobile-readiness scorer that is trained using training data. The mobile-readiness system may include a training subsystem that collects training pages, generates feature vectors relating to mobile readiness of pages, and inputs labels for the training pages. The feature vectors may contain page layout features, function availability features, horizontal scrolling features, understandability features, readability features, page length features, and/or vertical scrolling features. The labels may be scores that range from 1 to 5 with 1 indicating low mobile readiness and 5 indicating high mobile readiness. The training subsystem then trains a classifier using a machine learning technique such as a support vector machine, a Bayesian network, learning regression, and a neural network. After the classifier is trained, the mobile-readiness system uses a classifier as a mobile-readiness scorer to score the mobile readiness of target pages. To generate a mobile-readiness score for a target page, the mobile-readiness system generates a feature vector for the target page and then applies the classifier to the feature vector to generate the mobile-readiness score.

The mobile-readiness system evaluates the mobile readiness of a page by analyzing various features of the page. Table 1 lists categories of features that are used by the mobile-readiness system in some embodiments.

TABLE 1

| Category | Features |
| --- | --- |
| Page layout | The page layout uses absolute positions or units |
| | The page layout uses tables |
| | The page has background images |
| | The page has large images |
| Function availability | The page has unsupported tags (e.g., IFRAME) |
| | The page has unsupported scripts (e.g., Java script) |
| | The page has unsupported objects (e.g., movie formats) |
| Horizontal scrolling | The page has large or high resolution images |
| | The page has multiple columns |
| | The page has frames |
| | The page has unnecessary horizontal spaces |
| Understandability | The top of the page has complex navigation links |
| | The top of the page has decorative images not related to the primary content |
| Readability | The page has text in scaled-down images |
| Page length | The page has many large images |
| | The page is large |
| Vertical scrolling | The page is long |

Table 2 lists example features used by the mobile-readiness system in some embodiments. One skilled in the art will appreciate that the mobile-readiness system may use other features such as absolute size of a page in bytes. The mobile-readiness system may use all these features or various combinations of features.

TABLE 2

| | | |
| --- | --- | --- |
| F1 | page width | The minimum width (in pixels) of the page without horizontal scrolling |
| F2 | page height | The minimum height (in pixels) of the page without vertical scrolling |
| F3 | text size | The size (in bytes) of the page |
| F4 | foreground image count | The number of foreground images |
| F5 | background image count | The number of background images |
| F6 | foreground image total size | The summation of sizes (in bytes) of foreground images |
| F7 | background image total size | The summation of sizes (in bytes) of background images |
| F8 | foreground image average size | F6/F4 (in bytes) |
| F9 | background image average size | F7/F5 (in bytes) |
| F10 | frame count | The number of frames |
| F11 | column count | The number of columns |
| F12 | maximum image width | The maximum width (in pixels) of all images |
| F13 | maximum image height | The maximum height (in pixels) of all images |
| F14 | wide image count | The number of images wider than the width of the display of mobile devices (e.g., default of 200 pixels) |

TABLE 2-continued

| | | |
|---|---|---|
| F15 | absolute unit count | The number of absolute units (e.g., 120px) used in the attribute width in col, colgroup, hr, table, td and th(thread) tags |
| F16 | layout table tag count | The number of empty table tags such as <tr></tr> and <td></td> |
| F17 | small and transparent image count | The number of transparent images and images of less than 10 pixels |
| F18 | unsupported tag count | The number of tags such as object, applet, script, and iframe that are not supported by the mobile device |
| F19 | text image count | The number of images that include text and satisfy the following two conditions:<br>(1) The width of the image is greater than the width of the display of the mobile device and<br>(2) $(H_T * W_D)/WI \geqq 8$ (in pixels)<br>where $H_T$ is the average height (in pixels) of text regions, $W_D$ is the width (in pixels) of the display of a mobile device and WI is the width (in pixels) of the image |
| F20 | top link ratio: | $(A_L/A_M) * 100$<br>where $A_L$ is the area (in pixels) of all the links on the first page and $A_M$ is the area (in pixels) of the display of a mobile device |
| F21 | top image ratio | $(A_I/A_M) * 100$<br>where $A_I$ is the area (in pixels) of all the images on the first page and $A_M$ is the area (in pixels) of the display of a mobile device |

To detect text in images for feature F19 relating to text image count, the mobile-readiness system may use a text localization algorithm as described in Gllavata, J., Ewerth, I., and Freisleben, B., "A Text Detection, Localization and Segmentation System for OCR in Images," Proceedings of IEEE Sixth International Symposium on Multimedia Software Engineering, Florida, USA, August 2004, pp. 310-317. That algorithm detects images by creating a grayscale of the image, performing a wavelet transformation of the grayscale image, classifying text blocks using a K-means clustering algorithm, and identifying connected components.

The mobile-readiness system may use various learning methods to train the mobile-readiness scorer. These methods may include a support vector machine, a Bayesian network, logistics regression, and a neural network. The mobile-readiness system may use a support vector machine to train a classifier to classify pages based on mobile readiness. A support vector machine operates by finding a hyper-surface in the space of possible inputs. The hyper-surface attempts to split the positive examples (e.g., mobile-ready pages) from the negative examples (e.g., not mobile-ready pages) by maximizing the distance between the nearest of the positive and negative examples to the hyper-surface. A support vector machine simultaneously minimizes an empirical classification error and maximizes a geometric margin. This allows for correct classification of data that is similar to but not identical to the training data. Various techniques can be used to train a support vector machine. One technique uses a sequential minimal optimization algorithm that breaks the large quadratic programming problem down into a series of small quadratic programming problems that can be solved analytically. (See Sequential Minimal Optimization, at "http://" followed by "research.microsoft." and then followed by "com/~jplatt/smo.html".)

A support vector machine is provided training data represented by $(x_i, y_i)$ where $x_i$ represents a feature vector and $y_i$ represents a label for page i. A support vector machine may be used to optimize the following:

$$\min_{w,b,t} \frac{1}{2} w^T w + C \sum_{i=1}^{l} \xi_i \text{ such that } y_i(w^T \phi(x_i) + b) \geq 1 - \xi_i, \xi_i \geq 0$$

where vector w is perpendicular to the separating hyper-surface, the offset variable b is used to increase the margin, the slack variable $\epsilon_j$ represents the degree of misclassification of $x_i$, the function $\phi$ maps the vectors $x_i$ into a higher dimensional space, and C represents a penalty parameter of the error term. A support vector machine supports linear classification but can be adapted to perform non-linear classification by modifying the kernel function as represented by the following:

$$(K(x_i, x_j) \equiv \phi(x_i)^T \phi(x_j))$$

In some embodiments, the mobile-readiness system uses a Radial Basis Function ("RBF") kernel as represented by the following:

$$K(x_i, x_j) = \exp(-y\|x_i - x_j\|^2), y > 0$$

The mobile-readiness system may also use a polynomial, Gaussian radial basis function, or a sigmoid kernel. The mobile-readiness system may use cross-validation and grid search to find optimal values for parameters y and C. (See Hsu, C. W., Chang, C. C., and Lin, C. J., "A Practical Guide to Support Vector Machines," Technical Report, Dept. of Computer Science and Information Engineering, National Taiwan University, Taipei, 2003.) The mobile-readiness system may use an SVM for multiclass classification (e.g., low, medium, or high mobile-readiness). (See Dietterich, T. G. and Bakiri, G., "Solving Multiclass Learning Problem via Error Correcting Output Codes," Journal of Artificial Intelligence Research, 2 (1995), pp. 263-286; Dietterich, T. G. and Bakiri, G., "Error-Correcting Output Codes: A General Method for Improving Multiclass Inductive Learning Programs," Proceedings of AAAI-91, MIT Press, 1991, pp. 572-577; and Mayoraz, E. and Alpaydin, E., "Support Vector Machines for Multiclass Classification," Proceedings of the International Workshop on Artificial Intelligence Neural Networks, 1999.)

FIG. 1 is a block diagram that illustrates components of the mobile-readiness system in one embodiment. The mobile-readiness system 150 is connected to web site servers 120 and user computing devices 130 via communications link 110. The mobile-readiness system may include a crawler subsystem 160, a search subsystem 170, and a training subsystem 180.

The training subsystem uses training data to train a classifier to generate mobile-readiness scores. The training subsystem includes a collect training data component 181, a generate classifier component 182, a classifier parameters store 183, a training data store 184, and a generate feature vectors component 185. The collect training data component collects web pages used to train the classifier from the web site servers and stores them in the training data store. The generate classifier component generates feature vectors for the training pages using the generate feature vectors component, inputs labels of the training pages (e.g., from a person), trains the classifier using the feature vectors and the labels, and stores the parameters learned via the training in the classifier parameters store.

The crawler subsystem 160 may be a conventional web crawler that is augmented to generate mobile-readiness scores for the web pages. The crawler subsystem includes a web crawler 161, a keyword/page index 162, a mobile-readiness store 163, a generate mobile-readiness score component 164, and a classifier 165. The web crawler component crawls the various web site servers, generates mappings of keywords to the web pages that contain those keywords, and stores the mappings in the keyword/page index. The web crawler may invoke the generate mobile-readiness score component to generate the mobile-readiness scores as it locates a web page. The generate mobile-readiness score component uses the generate feature vectors component to generate the feature vector for the web page. The generate mobile-readiness score component then applies the classifier to the feature vector to generate the mobile-readiness score and stores a mapping of the web page to the score in the mobile-readiness store.

The search subsystem may be a conventional search engine that is augmented to rank search results based on a mobile-readiness score. The search engine receives search requests from user computing devices and ranks the search results based at least in part on the mobile-readiness scores of the web pages of the search results. The search subsystem includes a search engine 171, a find matching pages component 172, a rank search results component 173, and a generate ranking score component 174. The search engine, upon receiving a search request, invokes the find matching pages component to identify web pages using the keyword/page index that match the search request. The search engine then invokes the rank search results component to rank the web pages of the search result. The rank search results component invokes the generate ranking score component to generate a ranking score based at least in part on the mobile-readiness scores of the web pages of the search result as indicated in the mobile-readiness store. Alternatively, the search system may dynamically calculate the mobile-readiness scores of the web pages of the search result after the web pages are identified by the search engine.

The computing device on which the mobile-readiness system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the instructions, data structures, and message structures may be stored or transmitted via a data transmission medium, such as a signal on a communications link. Various communications links may be used, such as the Internet, a local area network, a wide area network, a point-to-point dial-up connection, a cell phone network, and so on.

Embodiments of the mobile-readiness system may be implemented in or used in conjunction with various operating environments that include personal computers, server computers, hand-held or laptop devices, multiprocessor systems, microprocessor-based systems, programmable consumer electronics, digital cameras, network PCs, minicomputers, mainframe computers, cell phones, personal digital assistants, smart phones, personal computers, programmable consumer electronics, distributed computing environments that include any of the above systems or devices, and so on.

The mobile-readiness system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments. For example, the training subsystem, the crawler subsystem, and the search subsystem may execute on different computing systems. The classifier may be generated by the training subsystem and distributed to various search engine services for use in assessing the mobile readiness of web pages or to other systems that may need to assess the mobile readiness of a web page, such as a browser.

Figure 2:
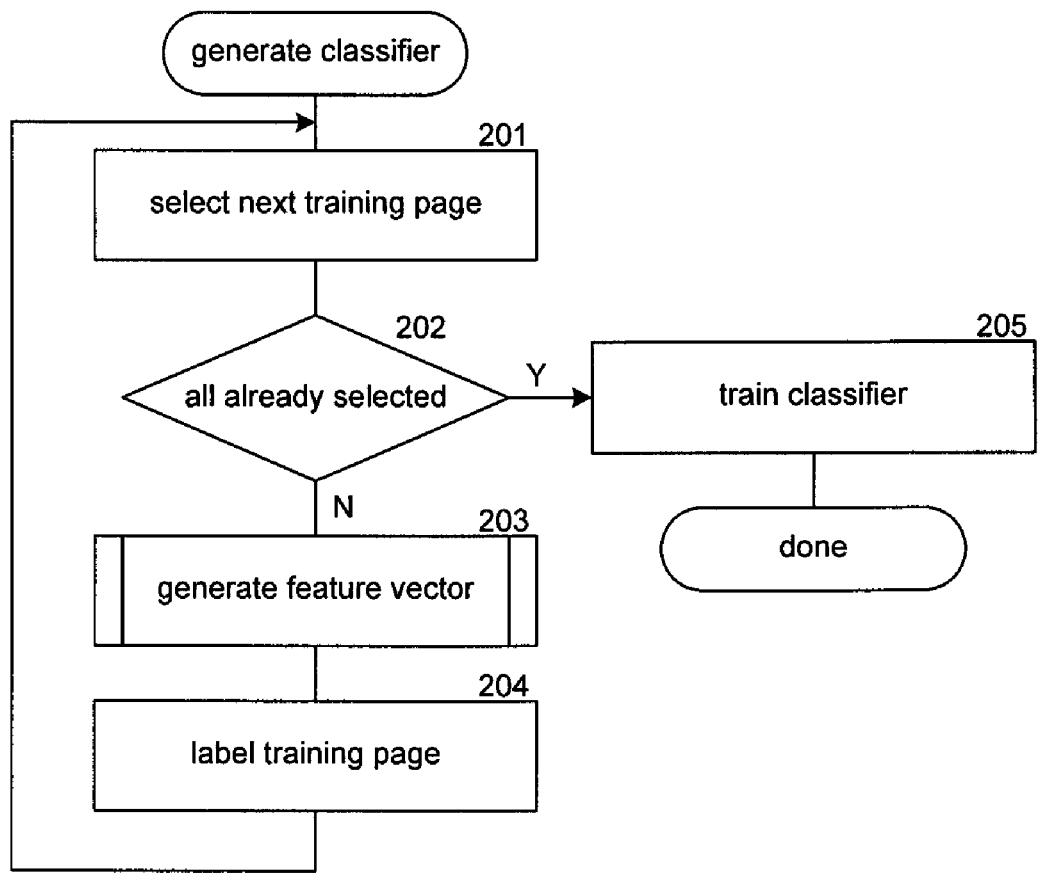
FIG. 2 is a flow diagram that illustrates the processing of the generate classifier component of the mobile-readiness system in one embodiment.

FIG. 2 is a flow diagram that illustrates the processing of the generate classifier component of the mobile-readiness system in one embodiment. The component generates feature vectors for the training pages, inputs labels for the training pages, and then trains the classifier. In block 201, the component selects the next training page. In decision block 202, if all the training pages have already been selected, then the component continues at block 205, else the component continues at block 203. In block 203, the component invokes the generate feature vectors component to generate a feature vector for the selected training page. In block 204, the component inputs a label for the training page and then loops to block 201 to select the next training page. In block 205, the component trains the classifier using the feature vectors and the labels. The component then completes.

Figure 3:
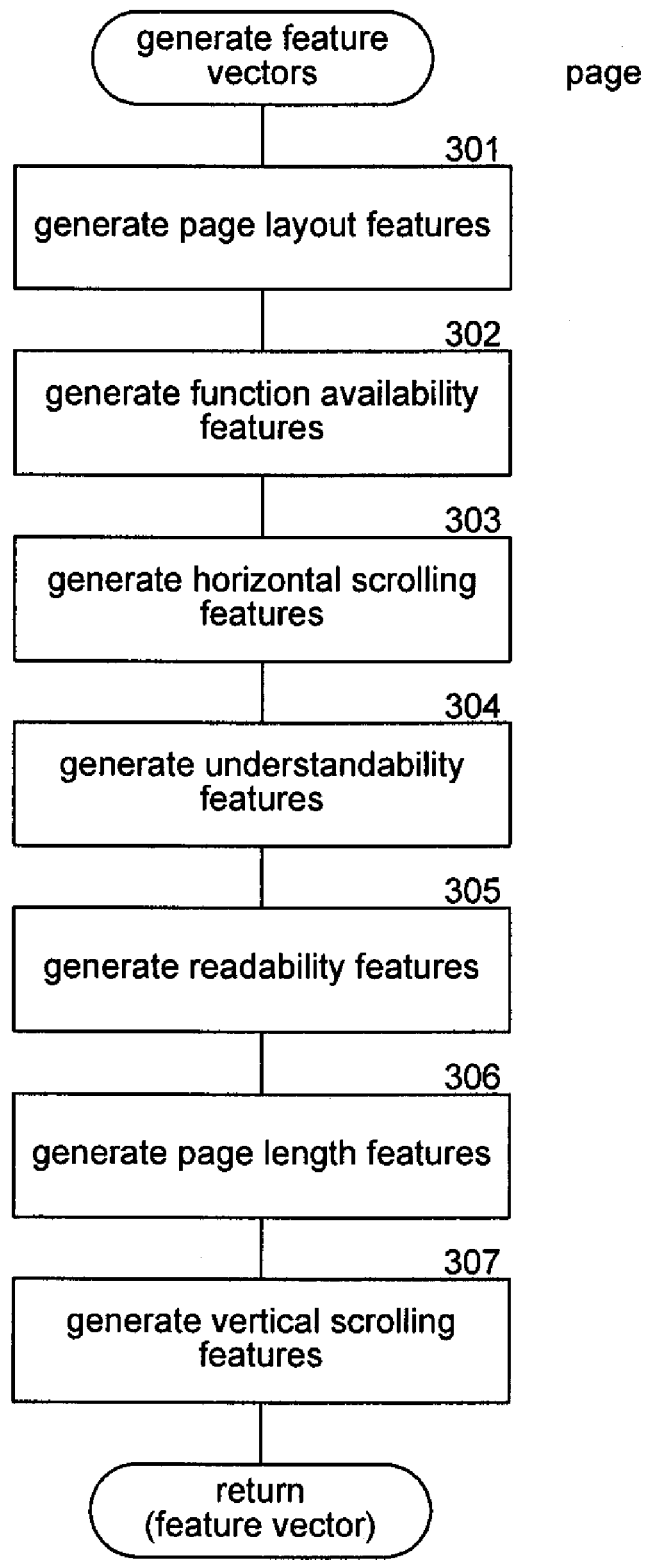
FIG. 3 is a flow diagram that illustrates the processing of the generate feature vectors component of the mobile-readiness system in one embodiment.

FIG. 3 is a flow diagram that illustrates the processing of the generate feature vectors component of the mobile-readiness system in one embodiment. The component is passed a page and generates a feature vector representing mobile-readiness features of the page. In block 301, the component generates page layout features relating to mobile readiness. In block 302, the component generates function availability features relating to mobile readiness. In block 303, the component generates horizontal scrolling features relating to mobile readiness. In block 304, the component generates understandability features relating to mobile readiness. In block 305, the component generates readability features relating to mobile readiness. In block 306, the component generates page length features relating to mobile readiness. In block 307, the component generates vertical scrolling features relating to mobile readiness. The component then returns a feature vector of the generated features.

Figure 4:
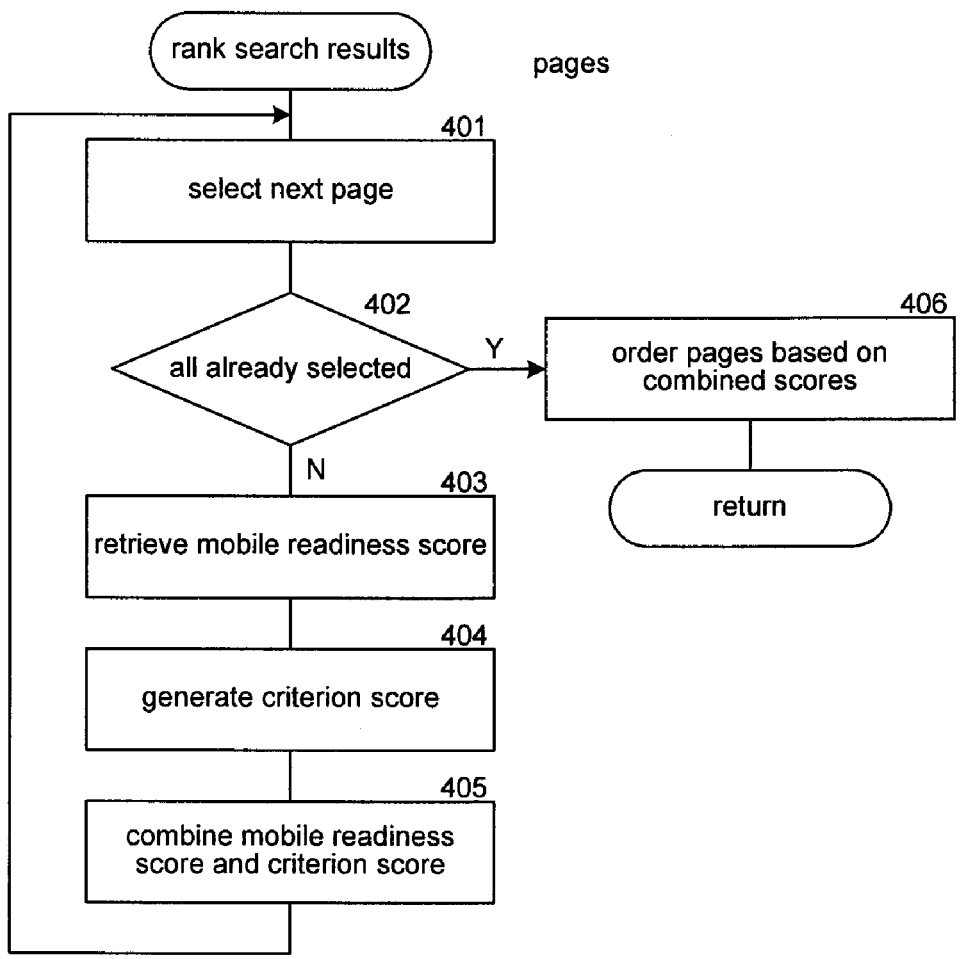
FIG. 4 is a flow diagram that illustrates the processing of the rank search results component of the mobile-readiness system in one embodiment.

FIG. 4 is a flow diagram that illustrates the processing of the rank search results component of the mobile-readiness system in one embodiment. The component is passed pages and then ranks the pages based at least in part on a mobile-readiness score. In block 401, the component selects the next page. In decision block 402, if all the pages have already been selected, then the component continues at block 406, else the component continues at block 403. In block 403, the component retrieves the mobile-readiness score for the selected page from the mobile-readiness store. In block 404, the component generates a criterion score that scores the selected page based on some criterion other than mobile readiness (e.g., relevance and importance). In block 405, the component combines the mobile-readiness score with the criterion score to generate a combined score for the selected page and then loops to block 401 to select the next page. The mobile-readiness score and the criterion score may be combined in various ways. For example, the scores may be combined linearly with the mobile-readiness score given a weight of $\beta$ and with the criterion score given a weight of $1-\beta$. Alternatively, the scores may be combined in a non-linear manner. In addition, the appropriate weights for the mobile-readiness score and the criterion score may be learned using various machine learning techniques. In block 406, the component orders the pages based on the combined scores and then returns.

Figure 5:
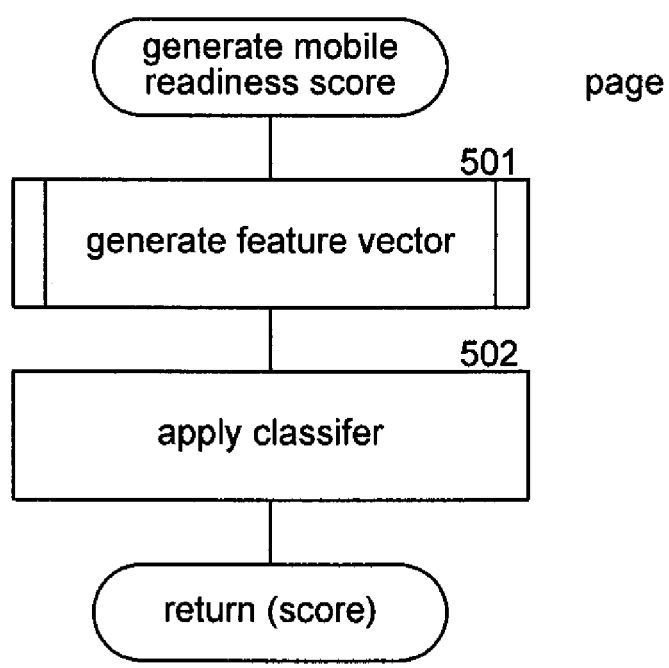
FIG. 5 is a flow diagram illustrating the processing of the generate mobile-readiness score component in one embodiment.

FIG. 5 is a flow diagram illustrating the processing of the generate mobile-readiness score component in one embodiment. The component is passed a target page and generates a mobile-readiness score for that target page. In block 501, the component invokes the generate feature vectors component to generate a feature vector for the target page. In block 502, the component applies the classifier to the generated feature vector to generate a mobile-readiness score. The component then returns the score.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. One skilled in the art will appreciate that the mobile-readiness scores may be used in any application that has a need to assess the mobile readiness of a page. One skilled in the art will appreciate that the term "mobile readiness" may relate to suitability of a page to be displayed on a small display, processed by a device with relatively low computation power, or transmitted via a channel with relatively low bandwidth (e.g., cell phone channel), individually or in various combinations. For example, the mobile-readiness system may be used to score suitability of a page to be displayed on a small display of a device having a relatively high bandwidth channel. In such a case, the mobile-readiness system may use features that relate primarily to such suitability. The mobile-readiness system may also be used to filter search results and provide to mobile devices only those pages that satisfy a threshold level of mobile friendliness (e.g., a mobile-readiness score above a threshold score). Accordingly, the invention is not limited except as by the appended claims.

We claim:

1. A computer-readable storage medium encoded with instructions for ranking pages, by a method comprising:
   receiving pages, the pages being pages of a search result for a search request;
   evaluating mobile readiness of the pages, the mobile readiness of a page relating to how well the page will function when displayed on mobile device with a small display area by:
      extracting first values of features of the page; and
      applying a mobile-readiness scorer to the first values of features to generate a mobile-readiness score for the page, by providing a mobile-readiness scorer having been trained by:
         collecting training pages;
         extracting second values of features of the training pages;
         labeling the training pages with input scores of mobile readiness of the training pages; and
         learning parameters for the mobile-readiness scorer that attempts to minimize differences between the input scores for the training pages and the mobile-readiness scores generated by the mobile-readiness scorer for the training pages based on the second values of the features by iteratively adjusting the parameters and determining the differences; and
      generating a mobile readiness score for the page as a function of the parameters and the first values of the features; and
   ranking the pages based on the mobile readiness and another criterion, the other criterion being based at least in part on relevance of the pages to the search request;
   wherein the features consist of page layout features, function availability features, horizontal scrolling features, understandability features, readability features, page length features, or vertical scrolling features.

2. The computer-readable storage medium of claim 1 wherein the other criterion is based at least in part on importance of a page.

3. The computer-readable storage medium of claim 1 wherein the evaluating of the mobile readiness is performed before receiving the pages.

4. The computer-readable storage medium of claim 1 wherein the mobile readiness of a page is based at least in part on suitability of the page to be displayed on a display that is smaller than one the page was designed to fit.

5. A computing system for determining mobile readiness of a page, comprising:
   a memory storing computer-executable instructions of:
      a component that receives pages, the pages being pages of a search result for a search request;
      a component that evaluates mobile readiness of the pages, the mobile readiness of a page relating to how well the page will function when displayed on mobile device with a small display area, the component that evaluates adapted to:
         extract first values of features of the page; and
         aply a mobile-readiness scorer to the first values of features to generate a mobile-readiness score for the page, the component that evaluates further adapted to:
            provide a mobile-readiness scorer having been trained by a training component adapted to:
               collect training pages;
               extract second values of features of the training pages;
               label the training pages with input scores of mobile readiness of the training pages; and
               learn parameters for the mobile-readiness scorer that attempts to minimize differences between the input scores for the training pages and the mobile-readiness scores generated by the mobile-readiness scorer for the training pages based on the second values of the features by iteratively adjusting the parameters and determining the differences; and
            generate a mobile readiness score for the page as a function of the parameters and the first values of the features; and
      a component that ranks the received pages based on the mobile readiness and another criterion, the other criterion being based at least in part on relevance of the pages to the search request;
      wherein the features consist of page layout features, function availability features, horizontal scrolling features, understandability features, readability features, page length features, or vertical scrolling features; and a processor that executes the computer-executable instructions stored in the memory.

6. The computing system of claim 5 wherein the other criterion is based at least in part on importance of a page.

7. The computing system claim 5 wherein the mobile readiness is evaluated before receiving the pages of the search results.

8. The computing system of claim 5 wherein the mobile readiness of a page is based at least in part on suitability of the page to be displayed on a display that is smaller than one the page was designed to fit.

* * * * *